US009294787B2

(12) United States Patent
de Sa et al.

(10) Patent No.: US 9,294,787 B2
(45) Date of Patent: Mar. 22, 2016

(54) AD HOC COLLABORATION NETWORK FOR CAPTURING AUDIO/VIDEO DATA

(71) Applicants: Marco de Sa, San Francisco, CA (US); David Ayman Shamma, San Francisco, CA (US); Elizabeth Churchill, San Francisco, CA (US)

(72) Inventors: Marco de Sa, San Francisco, CA (US); David Ayman Shamma, San Francisco, CA (US); Elizabeth Churchill, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 645 days.

(21) Appl. No.: 13/680,009

(22) Filed: Nov. 16, 2012

(65) Prior Publication Data

US 2014/0140675 A1 May 22, 2014

(51) Int. Cl.

| | |
|---|---|
| ***H04N 5/77*** | (2006.01) |
| ***H04N 21/218*** | (2011.01) |
| ***H04N 21/2187*** | (2011.01) |
| ***H04N 21/258*** | (2011.01) |
| ***H04N 21/2743*** | (2011.01) |
| ***H04N 21/414*** | (2011.01) |
| ***H04N 21/4223*** | (2011.01) |
| ***H04N 21/4788*** | (2011.01) |
| ***H04N 21/8549*** | (2011.01) |

(52) U.S. Cl.

CPC ..... *H04N 21/21805* (2013.01); *H04N 21/2187* (2013.01); *H04N 21/25841* (2013.01); *H04N 21/2743* (2013.01); *H04N 21/41407* (2013.01); *H04N 21/4223* (2013.01); *H04N 21/4788* (2013.01); *H04N 21/8549* (2013.01)

(58) Field of Classification Search

CPC .................... H04N 21/21805; H04N 21/2187; H04N 21/25841; H04N 21/2743; H04N 21/41407; H04N 21/4223; H04N 21/4788; H04N 21/8549

See application file for complete search history.

(56) References Cited

U.S. PATENT DOCUMENTS

| | | | | |
|---|---|---|---|---|
| 2004/0025180 | A1 * | 2/2004 | Begeja et al. | 725/46 |
| 2005/0193421 | A1 * | 9/2005 | Cragun | 725/80 |
| 2005/0212909 | A1 * | 9/2005 | Takehara et al. | 348/36 |
| 2009/0315974 | A1 * | 12/2009 | Matthews | 348/14.08 |
| 2012/0166077 | A1 * | 6/2012 | Herzog et al. | 701/425 |
| 2013/0022330 | A1 * | 1/2013 | Carter et al. | 386/224 |
| 2013/0162781 | A1 * | 6/2013 | Hubner et al. | 348/47 |

* cited by examiner

*Primary Examiner* — Tat Chio

(74) *Attorney, Agent, or Firm* — Martine Penilla Group, LLP

(57) ABSTRACT

Software authenticates a first user of a first mobile device and a second user of a second mobile device. Each of the mobile devices includes a video capturing device and each user agrees or has previously agreed to share video data captured by the user with other authenticated users. The software determines whether the first mobile device is located proximate to the second mobile device. Then the software receives video data captured by the second mobile device and transmits the video data to the first mobile device for display along with an annotation indicating the location of the second mobile device relative to the first mobile device, if the first mobile device is proximate to the second mobile device. The software receives an indication from the first mobile device that at least some of the video data is to be indexed in a profile associated with the first user.

20 Claims, 9 Drawing Sheets

WEBSITE HOSTING SOCIAL NETWORK/GRAPH

101 INTERNET

107

108

102

103

END USERS AT SAME EVENT

106

104

105

WEBSITE HOSTING SERVER SOFTWARE FOR MAINTAINING USER PROFILES, DETERMINING PROXIMITY, STORING EVENT DATA AND AUDIO/VISUAL DATA, etc.

AD HOC COLLABORATION NETWORK FOR CAPTURING AUDIO/VIDEO DATA

BACKGROUND

When making a professional audio-video (AV) recording of a live event such as a sports competition or a concert, a team of camera operators captures the event from multiple angles.

Given the quality of current digital video cameras in smartphones, a viewer at such an event can also make a video recording of the event using a smartphone. However, such a viewer can only capture the event from one angle at a time. And relocating to other angles might prove impossible due to ticketing or crowd constraints.

Using a smartphone app like Collabracam, an individual user and his/her friends might try to capture an event from multiple camera angles, like a professional team. However, such apps tend to employ a "film director" metaphor in which one smartphone user acts as a coordinator for other smartphone users who relinquish artistic control to the coordinator.

SUMMARY

In an example embodiment, a processor-executed method is described. The operations of the method might be performed approximately in real time by software running on a server. According to the method, the software authenticates a first user of a first mobile device and a second user of a second mobile device. Each of the mobile devices includes a video capturing device and each user agrees or has previously agreed to share video data captured by the user with other authenticated users. The software determines whether the first mobile device is located proximate to the second mobile device. Then the software receives video data captured by the second mobile device and transmits the video data to the first mobile device for display along with an annotation indicating the location of the second mobile device relative to the first mobile device, if the first mobile device is proximate to the second mobile device. Thereafter, the software receives an indication from the first mobile device that at least some of the video data is to be indexed in a profile associated with the first user.

In another example embodiment, an apparatus is described, namely, a computer-readable storage medium which persistently stores a program. The program might be a module in software running on a server and might perform the following operations in approximately real time. The program authenticates a first user of a first mobile device and a second user of a second mobile device. Each of the mobile devices includes a video capturing device and each user agrees or has previously agreed to share video data captured by the user with other authenticated users. The program determines whether the first mobile device is located proximate to the second mobile device. Then the program receives video data captured by the second mobile device and transmits the video data to the first mobile device for display along with an annotation indicating the location of the second mobile device relative to the first mobile device, if the first mobile device is proximate to the second mobile device. Thereafter, the program receives an indication from the first mobile device that at least some of the video data is to be indexed in a profile associated with the first user.

Another example embodiment also involves a processor-executed method. The operations of the method might be performed approximately in real time by software running on a server. According to the method, the software determines whether a first mobile device is located proximate to a second mobile device using wireless technology. Each of the mobile devices includes a video capturing device and the user of each mobile device agrees or has previously agreed to share video data captured by the mobile device with other users who agree to share video data captured by their mobile devices. Then the software receives and displays, at the first mobile device, video data captured by the second mobile device, along with an annotation indicating the location of the second mobile device relative to the first mobile device, if the first mobile device is proximate to the second mobile device. Thereafter the software persistently stores at least some of the video data on the first mobile device upon receipt of a command from the user of the first mobile device.

DETAILED DESCRIPTION

In the following description, numerous specific details are set forth in order to provide a thorough understanding of the exemplary embodiments. However, it will be apparent to one skilled in the art that the example embodiments may be practiced without some of these specific details. In other instances, process operations and implementation details have not been described in detail, if already well known.

Figure 1:
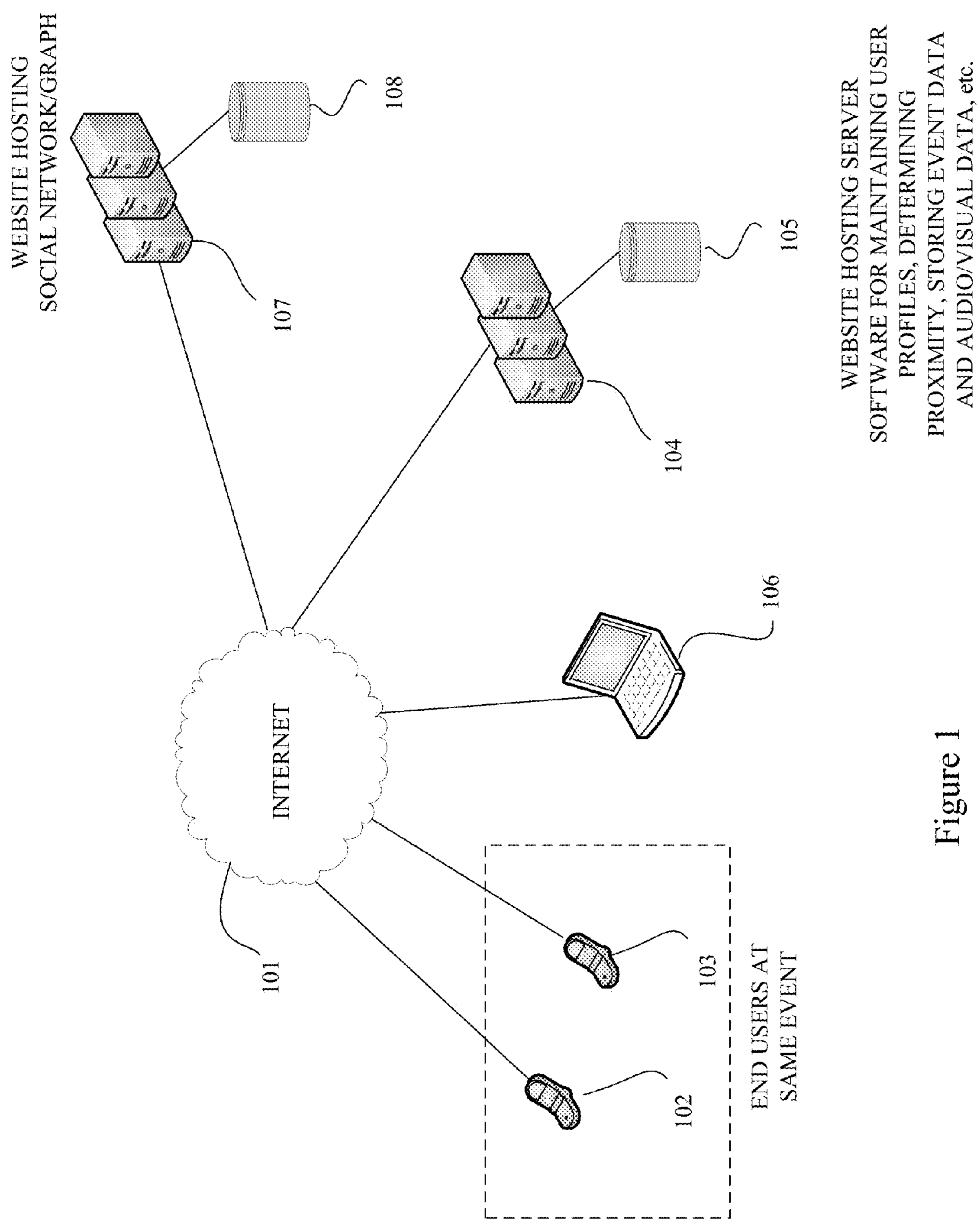
FIG. 1 is a network diagram that illustrates an ad hoc collaboration network for capturing audio/video data, in accordance with an example embodiment.

FIG. 1 is a network diagram that illustrates an ad hoc collaboration network for capturing audio/video data, in accordance with an example embodiment. As depicted in this figure, mobile devices 102 and 103 (e.g., smartphones such as an iPhone, Android, Blackberry, etc., or tablet computers such as an iPad, etc.) and computing device 106 (e.g., a laptop computer) are connected by a network 101 (e.g., a wide area network (WAN) including the Internet, which might be wireless in part or in whole, or a cellular network) with a website 104 hosting server software for client applications or apps that run on mobile devices 102 and 103 and website 107 hosting a social network/graph (e.g., Facebook, Google Plus, etc.) or other access control list (e.g., a contact list, a buddy list, an email distribution list, etc.). It will be appreciated that such a social network/graph describes relationships between users that tend to be more persistent than the ad hoc collaborative relationships between users that are disclosed in some embodiments herein. In an example embodiment, mobile devices 102 and 103 might be used by end users attending the same event at a particular location (e.g., a sporting event or a music concert) to capture audio/video data at the event and computing device 106 might be used by a user who wants to view the audio/video data captured at that event.

In an example embodiment, websites 104 and 107 might be composed of a number of servers connected by a network (e.g., a local area network (LAN) or a WAN) to each other in a cluster or other distributed system which might execute cloud platform software. The servers in website 104 might also be connected (e.g., by a storage area network (SAN)) to persistent storage 105 and the servers in website 107 might also be connected (e.g., by a storage area network (SAN)) to persistent storage 108. In example embodiments, persistent storage 105 and persistent storage 108 might include flash memory or a redundant array of independent disks (RAID).

Persistent storage 105 might be used to store user profiles, location and/or position data, event data (including timestamps), audio/video data, etc., which is used in the processes disclosed herein. Some of this data, including location and/or position data and/or event data, might have been retrieved (e.g., using a web application programming interface (API)) from: (1) profiles and/or content streams maintained in persistent storage 108 by website 107; and/or (2) a so-called "location-based social networking website" such as Four Square or Gowalla.

In an example embodiment, some of the data from persistent storage 105 might be cached in volatile memory on servers on website 104 (e.g., using (a) an in-memory database or main memory database system (MMDB) or (b) a hybrid in-memory database that also uses persistent storage) in order to improve performance. Similarly, in an example embodiment, some of the data from persistent storage 108 might be cached in volatile memory on servers on website 107 (e.g., using (a) an in-memory database or main memory database system (MMDB) or (b) a hybrid in-memory database that also uses persistent storage in order to improve performance.

Computing device 106 and the servers in websites 104 and 106 might include (1) hardware having one or more microprocessors (e.g., from the x86 family or the PowerPC family), volatile storage (e.g., RAM), and persistent storage (e.g., a hard disk or solid-state drive and/or flash memory), and (2) an operating system (e.g., Windows, Mac OS, Linux, Windows Server, Mac OS Server, etc.) that runs directly or indirectly (e.g., through virtualization software) on the hardware. Or the operating system for the servers might be replaced by a hypervisor or other virtualization software. Mobile devices 102 and/or 103 might be smartphones, tablet computers, or other similar mobile devices that include (1) hardware having one or more low-power microprocessors (e.g., from the ARM family), volatile storage (e.g., RAM), persistent storage (e.g., flash memory such as microSD), a digital video camera (e.g., that uses an OmniVision image sensor), and a microphone and (2) an operating system (e.g., Symbian OS, RIM BlackBerry OS, iPhone OS, Palm webOS, Windows Mobile, Android, Linux, etc.) that runs on the hardware.

Also in an example embodiment, mobile devices 102 and 103 and computing device 106 might include a web browser as an application program or part of an operating system. Examples of web browsers that might execute on computing device 106 include Internet Explorer, Mozilla Firefox, Safari, and Google Chrome. Examples of browsers that might execute on mobile devices 102 and 103 include Safari, Mozilla Firefox, Android Browser, and Palm webOS Browser. It will be appreciated that users of the mobile devices 102 and 103 and computing device 106 might use browsers (e.g., supporting HTML5) to communicate with software running on the servers at website 104. Alternatively, users of the mobile devices 102 and 103 and computing device 106 might use other application programs to communicate with software running on the servers at website 104. For example, if mobile computing devices 102 and 103 are smartphones, tablet computers, or other similar mobile devices, users of the mobile devices might use an app or a hybrid app (e.g., an app written in Objective C or Java that includes embedded HTML5) to communicate with software running on the servers at website 104. It will be appreciated that an application program for a mobile device is often referred to as an "app".

In an example embodiment, websites 104 and/or 107 are composed of a number of servers connected by a network (e.g., a local area network (LAN) or a WAN) to each other in a cluster or other distributed system which might run website software (e.g., software in a LAMP (Linux, Apache, MySQL, PHP) or LAMMP (Linux, Apache, memcached, MySQL, PHP) architecture, etc.) and/or distributed-computing software such as Hadoop (which implements Map-Reduce and/or the Google Filesystem), Pig, Dremel, etc. In an alternative example embodiment, websites 104 and/or 107 might be implemented using a public, private, or hybrid cloud platform, e.g., a hybrid cloud platform whose public cloud is Amazon Electric Compute Cloud (EC2) and whose private cloud is built using Cloud.com's CloudStack software. In an alternative example embodiment, websites 104 and/or 107 might be implemented using other public clouds and/or other private clouds that provide similar functionality. Or, websites 104 and/or 107 might be implemented without resort to third-party cloud platforms, e.g., using (a) OpenStack or (b) load balancing and virtualization software (e.g., Citrix XenServer, VMware, Microsoft, or Xen), distributed computing software such as Hadoop, distributed memory-caching software (such as memcached), distributed key-value database software (such as Couchbase Server nee Membase Server), NoSQL database-management software, structured database-management software (such as MySQL), etc. Parenthetically, it will be appreciated that SQL is an acronym which stands for Structured Query Language.

Figure 2:
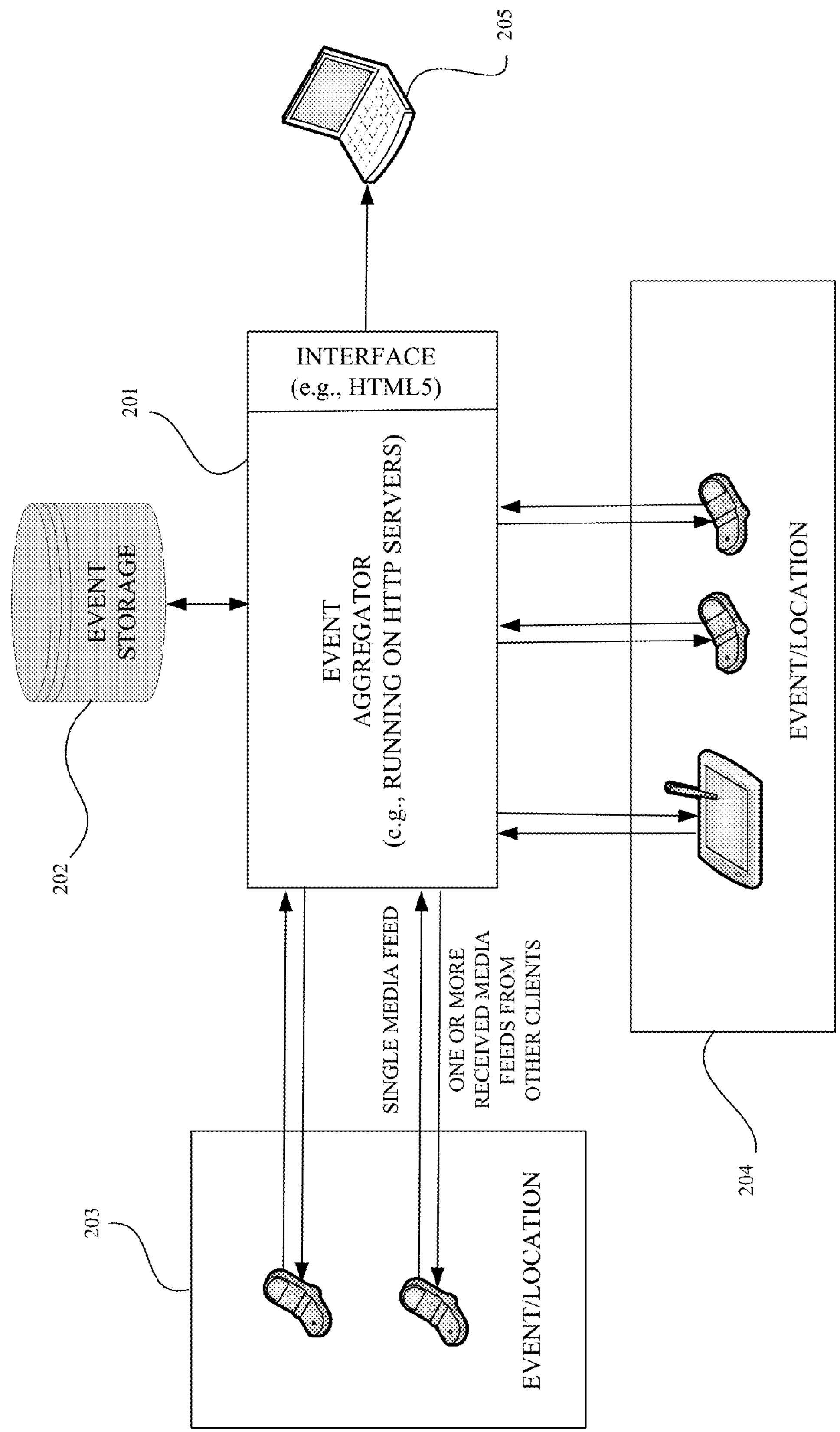
FIG. 2 is a diagram that illustrates a client-server architecture for an ad hoc collaboration network for capturing audio/video data, in accordance with an example embodiment.

FIG. 2 is a diagram that illustrates a client-server architecture for an ad hoc collaboration network for capturing audio/video data, in accordance with an example embodiment. As depicted in this figure, server software that includes an event aggregator 201 is running on servers at a website such as website 104 as described above. The event aggregator 201 communicates with client software such as an app or hybrid app on mobile devices (e.g., smartphones and/or tablets equipped with digital video cameras and microphones) at events/locations, using a networking protocol such as HTTP (Hypertext Transfer Protocol), possibly in conjunction with the networking protocol SPDY. The event aggregator 201 also communicates through an interface (e.g., an HTML5 interface) with client software such as a browser on computing device 205 (e.g., a laptop computer), which a user can use to stream/download audio/video data stored in event storage 202, which might be a part of persistent storage 105 as described above.

As depicted in FIG. 2, two users at event/location 203 are using client software such as an app running on mobile devices (e.g., smartphones). Such mobile devices are logical clients in a client-server architecture. Each client (e.g., smartphone) transmits a single media feed of audio/video data to the event aggregator 201, which acts as the logical server in a client-server architecture. After receiving the single media feeds from each of the clients (e.g., the two smartphones) at event 203, the event aggregator 201 might store the received media feeds in event storage 202 and serve the received media feeds to other clients at event/location 203 (or to computing device 205). Thus, the event aggregator 201 might receive a single media feed from one client (e.g., the topmost smartphone) at event/location 203 and serve the received media feed to another client (e.g., the bottommost smartphone) at event/location 203.

Likewise, the event aggregator 201 might receive a single media feed from each of the clients (e.g., the tablet and the two smartphones) at event/location 204 and serve (a) one of the received media feeds to the other non-originating clients (e.g., the tablet and the leftmost smartphone), (b) another of the received media feeds to the other non-originating clients (e.g., the tablet and the rightmost smartphone), and (c) the remaining received media feed to the other non-originating clients (e.g., the two smartphones). In an example embodiment, the event aggregator 201 might serve only one received media feed to a single non-originating mobile device at a time. In an alternative example embodiment, the event aggregator 201 might serve more than one received media feed to a single non-originating mobile device at the same time.

Figure 3:
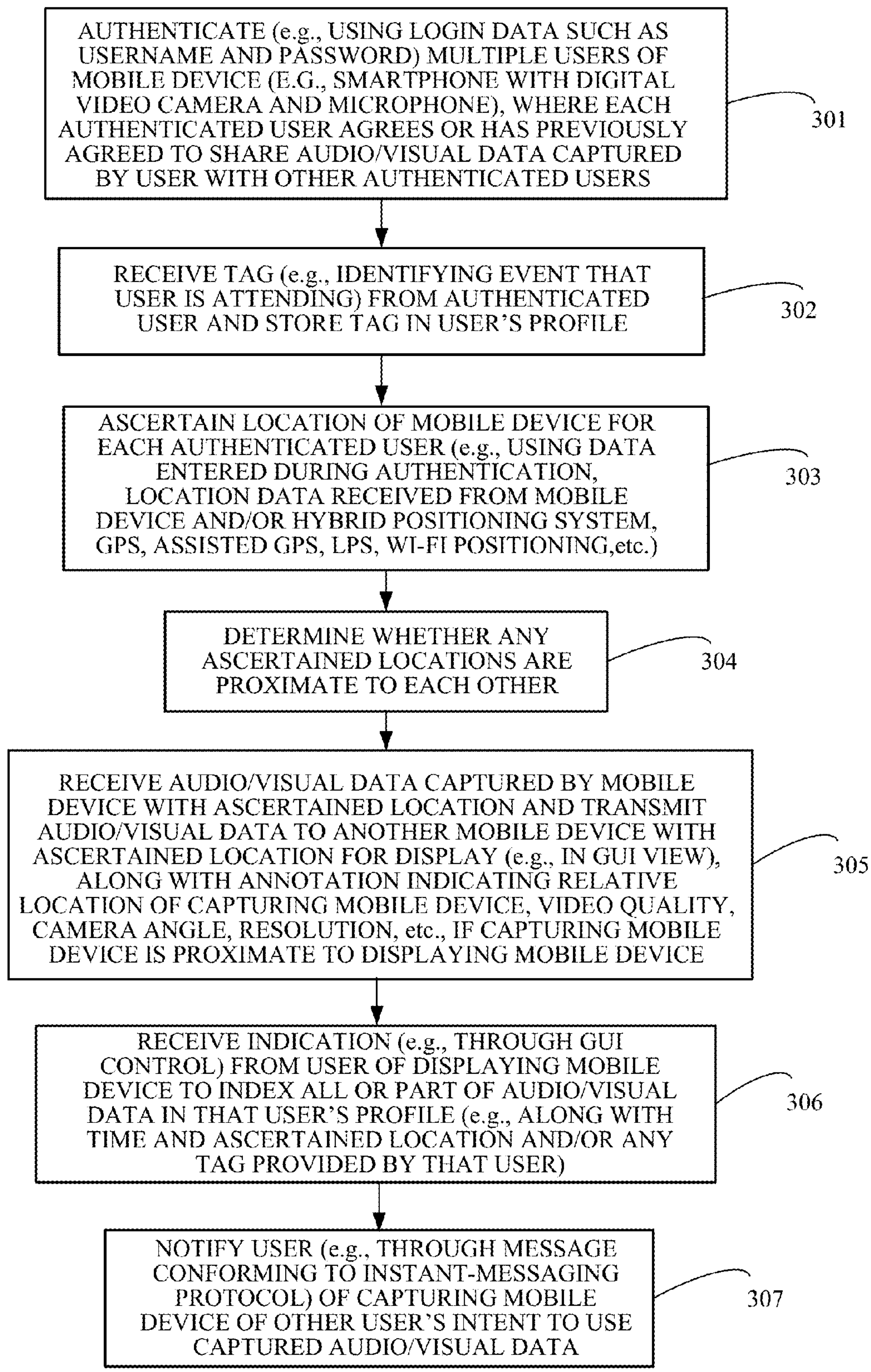
FIG. 3 is a flowchart diagram that illustrates a process that might execute on a server in a client-server architecture for an ad hoc collaboration network for capturing audio/video data, in accordance with an example embodiment.

FIG. 3 is a flowchart diagram that illustrates a process that might execute on a server in a client-server architecture for an ad hoc collaboration network for capturing audio/video data, in accordance with an example embodiment. In an example embodiment, some or all of the operations in this process might be performed in real-time or near real-time by the event-aggregator software described in FIG. 2 or some other software running on servers at website 104. As depicted in FIG. 3, the software authenticates (e.g., using login data such as username and password) multiple users of mobile devices (e.g., a smartphone with a digital video camera and a microphone), in operation 301. In an example embodiment, each of the authenticated users agrees during authentication (e.g., through a GUI dialog) or has previously agreed (e.g., when creating an account to download client software onto a mobile device) to share the audio/video data captured by the user with other authenticated users (e.g., users who have made reciprocal agreements). In operation 302, the software receives (e.g., through a GUI dialog) a tag identifying the event that the user is attending and/or other event data (e.g., such as names of friends and/or contacts at the event) from an authenticated user and stores the tag and/or other event data in the user's profile. It will be appreciated that such a tag facilitates later search and retrieval by the user of any audio/video data associated with the tag, e.g., for purposes of playback, editing, mixing, distribution using a social graph/network, etc. Then in operation 303, the software ascertains the location of the mobile device for each authenticated user (e.g., using data entered during authentication, location data received from the mobile device and/or a hybrid positioning system, GPS (Global Positioning System), assisted GPS, LPS (Local Positioning System), Wi-Fi positioning, indoor positioning systems that use magnetic sensors, other indoor positioning systems, etc.). In operation 304, the software determines whether any ascertained locations are proximate to each other. And in operation 305, the software receives audio/video data captured by a mobile device with an ascertained location and transmits the audio/video data to another mobile device with an ascertained location for display (e.g., in a GUI view) along with an annotation indicating the relative location of capturing mobile device, video quality (e.g., shakiness), camera angle, resolution, other sensor readings, etc., if the capturing mobile device is proximate to the displaying mobile device. It will be appreciated that the data described in the annotation might be based at least in part on data that was transmitted by the capturing mobile device, e.g., relative location, video quality, camera angle, or resolution. In an example embodiment, data regarding ambient light might be based on readings from an ambient light sensor on the capturing mobile device and data regarding camera angle might be based on readings from compass and/or gyroscope sensors on the capturing mobile device. And data regarding shakiness might be based on readings from an accelerometer on the capturing mobile device, e.g., where zero acceleration indicates no shakiness. In operation 306, the software receives an indication (e.g., through a GUI control or widget) from the user of the displaying mobile device to index for all or part of the audio/video data in that user's profile (e.g., along with the time and the ascertained location and/or any tag provided by that user), for later retrieval and playback, editing, mixing, distribution using a social graph/network, etc., by that user. And in operation 307, the software notifies the user of the capturing mobile device (e.g., through a message conforming to an instant-messaging protocol, an SMS (Short Message Service) protocol, a Twitter protocol, etc.) of the other user's intent to use the captured audio/video data. It will be appreciated that such a notification encourages the user of the capturing mobile device to continue to capture audio/video data.

In operation 302, the software receives (e.g., through a GUI dialog) a tag identifying the event that the user is attending for use in subsequent search and retrieval of any audio/video data associated with the tag and/or other event data (e.g., such as names of friends and/or contacts at the event) from an authenticated user and stores the tag and/or other event data in the user's profile. In an example embodiment, a profile for a user might be associated with login data (e.g., a username and a password) and might persistently store other data associated with a user, in addition to event tags. For example, a user profile might store the user's preferences and/or interests, as explicitly expressed by the user (e.g., explicit or active relevance feedback) or implicitly gleaned from the user's usage behavior (e.g., implicit or passive relevance feedback), including preferences and/or interests in future events. In an example embodiment, a user profile might also store a social graph for the user, e.g., a friends, followers, or other access control list retrieved from a social networking website such as Facebook or Twitter through a web API exposed by the social networking website. And a user profile might store the user's audio/video data and their metadata (e.g., time, location, event, friends and/or contacts also at event, etc.) and/or indices for audio/video data captured by other users, e.g., as described in operations 305 and 306.

In an alternative example embodiment, the tag identifying the event or other event data might not be entered by the user. Instead, the tag and/or other event data might be retrieved (e.g., using a web application programming interface (API)) from a social networking website such as Facebook or Twitter and/or a so-called "location-based social networking website" such as Four Square or Gowalla.

In operation 304, the software determines whether any ascertained locations are proximate to each other. In an example embodiment, the software might perform distance computations on the ascertained locations, when making this determination. Or the software might make this determination based on location, position, proximity, and/or event data retrieved from another website, e.g., through a web API exposed by a social networking website (e.g., Facebook) or a location-based social networking website (e.g., Four Square).

Figure 4:
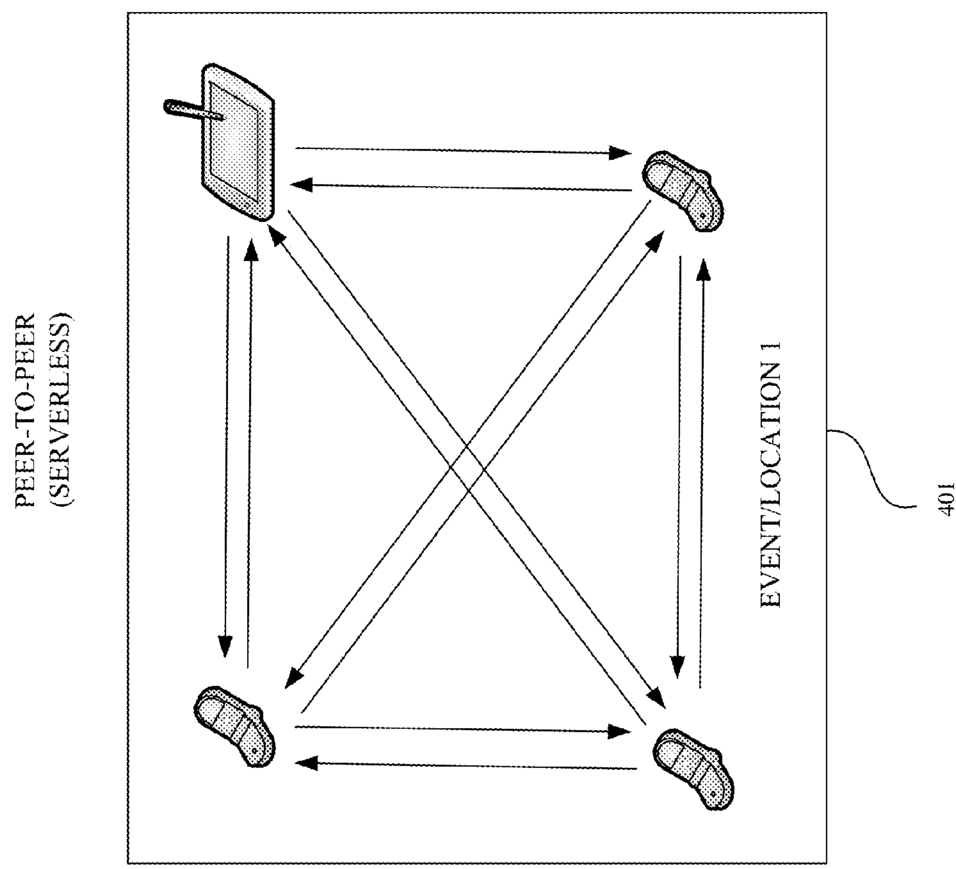
FIG. 4 is a diagram that illustrates a peer-to-peer architecture for an ad hoc collaboration network for capturing audio/video data, in accordance with an example embodiment.

FIG. 4 is a diagram that illustrates a peer-to-peer architecture for an ad hoc collaboration network for capturing audio/video data, in accordance with an example embodiment. As depicted in this figure, peer software such as an app or hybrid app enables four mobile devices (e.g., smartphones or tablets equipped with digital video cameras and microphones) at event/location 401 to detect each other without the assistance of a server. In an example embodiment, the peer software might make use of a WPAN (Wireless Personal Area Network) technology such as Bluetooth or IrDA (Infrared Data Association). In another example embodiment, the peer software might use NAN technology (Near-me Area Network), Wi-Fi or other WLAN (wireless local area network) technology, other wireless technology such as 3G or 4G cellular network technology, etc. As depicted in FIG. 401, each mobile device (e.g., smartphone) transmits a single media feed of audio/video data to the other mobile devices, where the media feed might be persistently stored in whole or in part.

Figure 5:
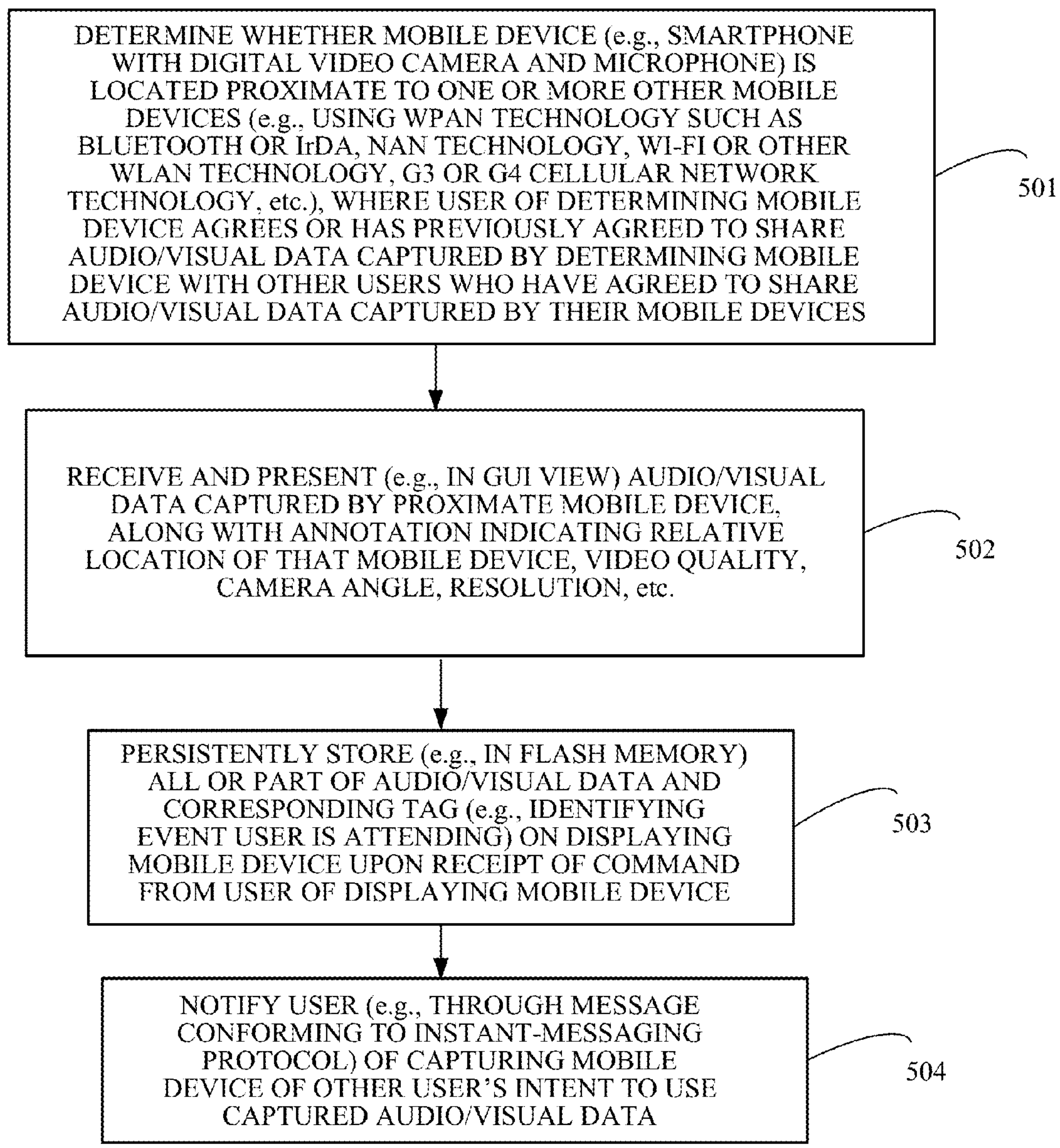
FIG. 5 is a flowchart diagram that illustrates a process that might execute on a mobile device in a peer-to-peer architecture for an ad hoc collaboration network for capturing audio/video data, in accordance with an example embodiment.

FIG. 5 is a flowchart diagram that illustrates a process that might execute on a mobile device in a peer-to-peer architecture for an ad hoc collaboration network for capturing audio/video data, in accordance with an example embodiment. In an example embodiment, some or all of the operations in this process might be performed in real-time or near real-time by the peer-to-peer software described in FIG. 4 or some other software running on a mobile device. As depicted in FIG. 5, the software detects whether its mobile device (e.g., smartphone with digital video camera and microphone) is located proximate to one or more other mobile devices (e.g., using WPAN technology such as Bluetooth or IrDA, NAN technology, Wi-Fi or other WLAN technology, 3G or 4G cellular network technology, indoor positioning systems that use magnetic sensors, other indoor positioning systems, etc.), in operation 501. In an example embodiment, the user of the detecting mobile device agrees (e.g., through a GUI dialog presented following detection) or has previously agreed (e.g., when creating an account to download peer software onto the mobile device) to share the audio/video data captured by the detecting mobile device with other users who make reciprocal agreements. In operation 502, the software on the detecting mobile device receives (e.g., through a GUI dialog) a tag identifying the event that the user is attending and/or other event data (e.g., such as names of friends and/or contacts at the event) from its user and stores the tag and/or other data in the user's profile on the detecting mobile device. Here again, it will be appreciated that such a tag facilitates later search and retrieval by the user of any audio/video data associated with the tag, e.g., for purposes of playback, editing, mixing, distribution using a social graph/network, etc. In operation 503, the software on the detecting mobile device receives and presents (e.g., in a GUI view) audio/video data captured by the detected mobile device, along with an annotation indicating the relative location of the detected mobile device, video quality (e.g., shakiness), camera angle, resolution, other sensor readings, etc., if the detected mobile device is capturing audio/video data (e.g., as indicated in a transmission to the detecting mobile device). It will be appreciated that the data described in the annotation might be based at least in part on data that was transmitted by the detected mobile device, e.g., relative location, video quality, camera angle, or resolution. In an example embodiment, data regarding ambient light might be based on readings from an ambient light sensor on the capturing mobile device and data regarding camera angle might be based on readings from compass and/or gyroscope sensors on the capturing mobile device. And data regarding shakiness might be based on readings from an accelerometer on the capturing mobile device, e.g., where zero acceleration indicates no shakiness. Then in operation 504, the software on the detecting mobile device receives a command from its user to persistently store (e.g., in flash memory) all or part of the audio/video data captured by the detected mobile device (e.g., along with the time and the ascertained location and/or any tag provided by the user of the detecting mobile device) and performs the command. In operation 505, the software on the detecting mobile device notifies the user of the detected mobile device (e.g., through a message conforming to an instant-messaging protocol, an SMS (Short Message Service) protocol, a Twitter protocol, etc.) that the user of the detecting mobile device intends to use the captured audio/video data. It will be appreciated that such a notification encourages the user of the detected mobile device to continue to capture audio/video data.

In operation 501, the software detects whether its mobile device (e.g., smartphone with digital video camera and microphone) is located proximate to one or more other mobile devices. In an alternative example embodiment, the software might instead make a determination that its mobile device is located proximate to one or more other mobile devices through the use of location, position, and/or proximity data retrieved from the other mobile devices or from a website, e.g., through a web API exposed by a social networking website (e.g., Facebook) or a location-based social networking website (e.g., Four Square).

In operation 502, the software on the detecting mobile device receives (e.g., through a GUI dialog) a tag identifying the event that the user is attending and/or other event data (e.g., such as names of friends and/or contacts at the event) from its user and stores the tag and/or other event data in the user's profile on the detecting mobile device. In an example embodiment, such a profile might persistently store other data associated with a user, in addition to event tags. For example, a user profile on a mobile device might store the user's preferences and interests, as explicitly expressed by the user (e.g., explicit or active relevance feedback) or implicitly gleaned from the user's usage behavior (e.g., implicit or passive relevance feedback). In an example embodiment, a user profile might also store a social graph for the user, e.g., a friends, followers, or other access control list retrieved from a social networking website such as Facebook or Twitter through a web API exposed by the social networking website. And a user profile might store the user's videos and their metadata (e.g., time, location, event, friends and/or contacts also at event, etc.) and/or videos captured by other users and metadata for those videos, e.g., as described in operation 504.

Here again, in an alternative example embodiment, the tag identifying the event or other event data might not be entered by the user. Instead, the tag and/or other event data might be retrieved (e.g., using a web application programming interface (API)) from a social networking website such as Facebook or Twitter and/or a so-called "location-based social networking website" such as Four Square or Gowalla.

In operation 504, the software on the detecting mobile device receives a command from its user to persistently store (e.g., in flash memory) all or part of the audio/video data captured by the detected mobile device (e.g., along with the time and the ascertained location and/or any tag provided by the user of the detecting mobile device) and performs the command. In an example embodiment, the software might store (e.g., in flash memory) the audio/video data on its mobile device, e.g., up to a specified size limit. In an alternative example embodiment, the software might use collaborative storage (e.g., with relatively small data granularity and erasure code for data redundancy) to store the audio/video data, e.g., as discussed in Li et al., *Collaborative Storage with*

*Mobile Devices in Wireless Networks for P2P Media Sharing*, Proceeding of the 7th Annual IEEE Wireless Telecommunications Symposium (IEEE WTS 2008), which is incorporated herein by reference.

Figure 6:
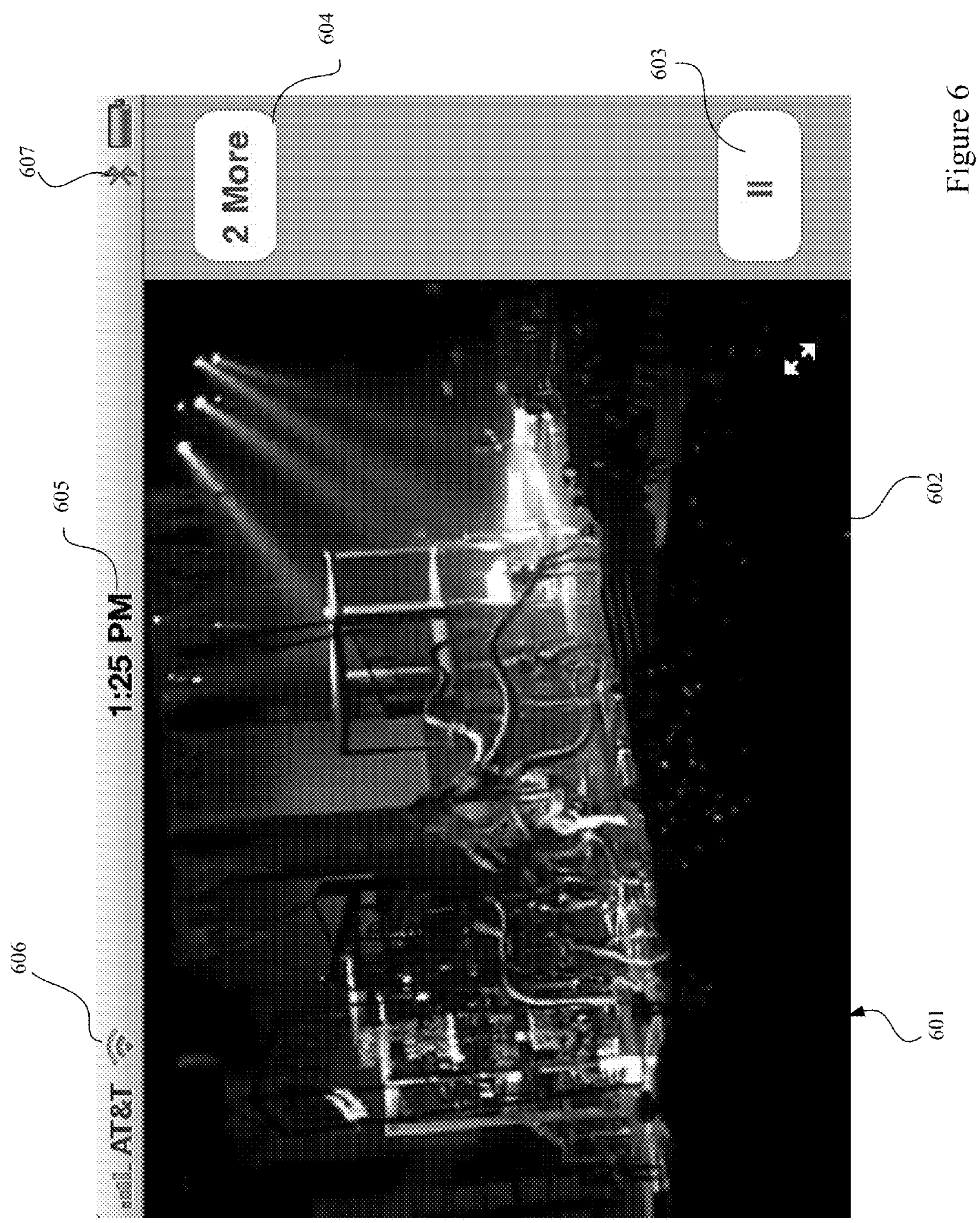
FIGS. 6, 7, and 8 are views in a graphical user interface (GUI) that might be displayed by an app or a browser on a mobile device in an ad hoc collaboration network for capturing audio/video data, in accordance with an example embodiment.

FIG. 6 is a view in a graphical user interface (GUI) that might be displayed by an app or a browser on a mobile device in an ad hoc collaboration network for capturing audio/video data, in accordance with an example embodiment. As shown in this figure, GUI view 601 includes a video player 602 that displays audio/video data currently captured by the mobile device at an event (e.g., a concert). In an example embodiment, the capturing of the audio/video data might be controlled by widget or control 603 (e.g., a GUI button). As shown in this figure, the icon for control 603 currently displays a "pause recording" symbol (e.g., by analogy to the symbols used to label cassette player/recorder "piano keys"). GUI view 601 includes another control 604 (e.g., a GUI button). The text label of GUI control 604 indicates that "2 More" mobile devices are also capturing audio/video data at the event. GUI view 601 also includes an infobar that indicates the current time 605 (e.g., 1:25 PM) and that indicates the mobile device is presently using a Wi-Fi protocol for networking (as shown by Wi-Fi signal-strength or energy meter 606), rather than a Bluetooth protocol (as shown by grayed-out Bluetooth icon 607). It will be appreciated that "2 More" mobile devices is used for illustrative purposes here and should not be interpreted as limiting. In another example scenario, there might be "20 More" mobile devices capturing audio/video data at the event, e.g., in a 360 degree circle whose (a) center is the mobile device displaying GUI view 601 and (b) radius might vary.

Figure 7:
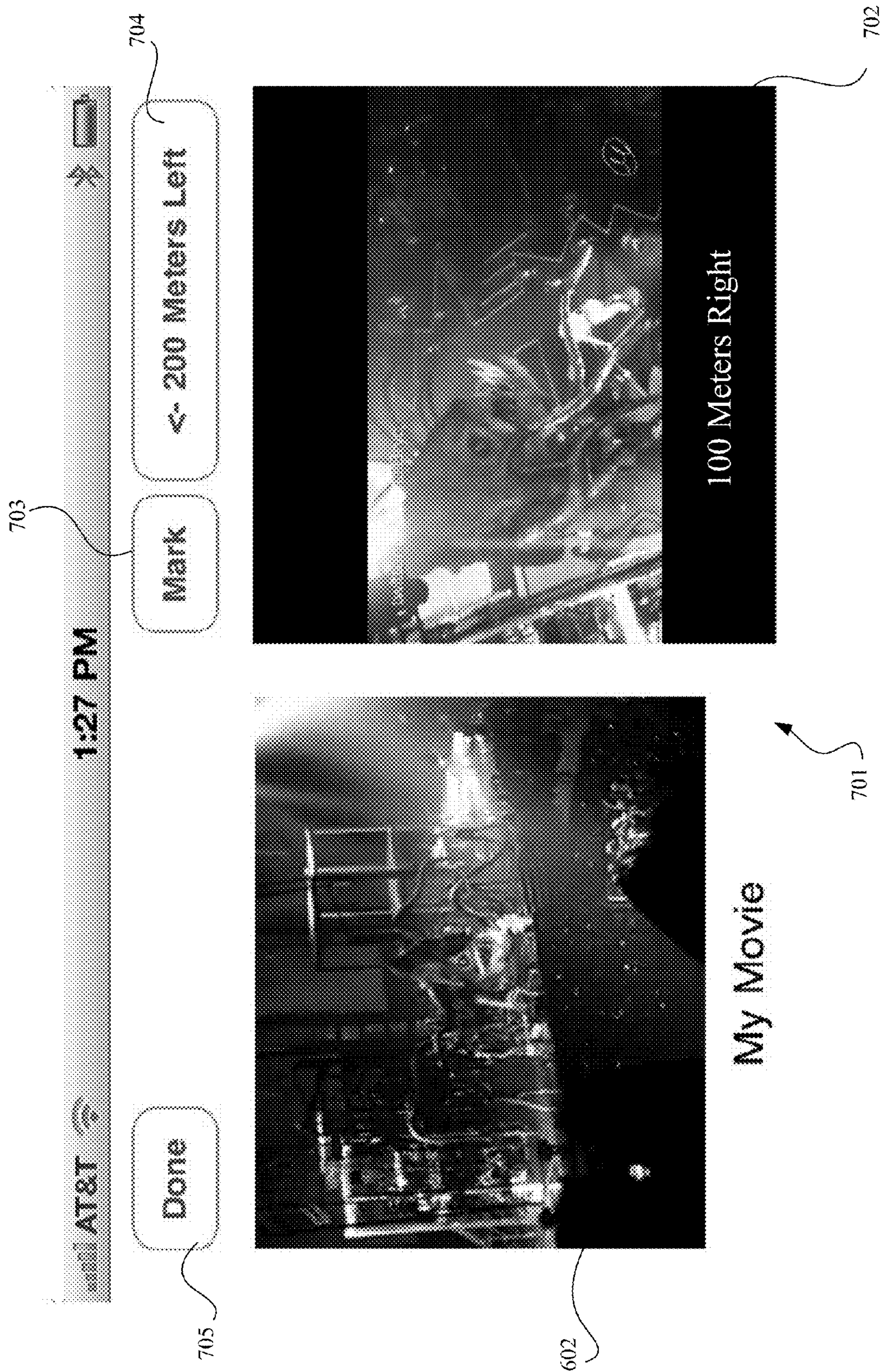

FIG. 7 is a GUI view which might be displayed by an app or a browser on the same mobile device a short time later (e.g., 1:27 PM), if the user of the mobile device presses on the GUI control 604 labeled "2 More". As shown in this figure, GUI view 701 also includes video player 602 that continues to display audio/video data currently captured by the mobile device, above a text box stating "My Movie". Above video player 602 is a control 705 (e.g., a GUI button) with a text label "Done" that allows the user of the mobile device displaying GUI view 701 to stop recording the audio/video data currently displayed in video player 602, e.g., if the user decides to use the audio/video data captured by one of the other two mobile devices capturing audio/video data at the event. Additionally, GUI view 701 includes another video player 702 that displays audio/video data currently captured by one of the other two mobile devices also capturing audio/video data at the event, namely, a mobile device that is "100 Meters Right" of the mobile device displaying GUI view 701, as indicated by the text label displayed at the bottom of video player 702. Above video player 702 is a control 703 (e.g., a GUI button) with a text label "Mark" that allows the user of the mobile device displaying GUI view 701 to indicate that the audio/video data displayed in video player 702 is to be indexed (or stored) in the user's profile, e.g., beginning at the time that the control 703 labeled "Mark" is pressed by the user. In an example embodiment, if a user presses on control 703 labeled "Mark", GUI view 701 might also display GUI dialogs that (a) allow the user to annotate the audio/video data being indexed (or stored) and (b) communicate (e.g., using an instant-messaging protocol, an SMS (Short Message Service) protocol, a Twitter protocol, etc.) with the user who is capturing that audio/video data. Also above video player 702 is another control 704 (e.g., a GUI button) with a text label "←200 Meters Left" which identifies the location of the final mobile device capturing audio/video data at the event.

Figure 8:
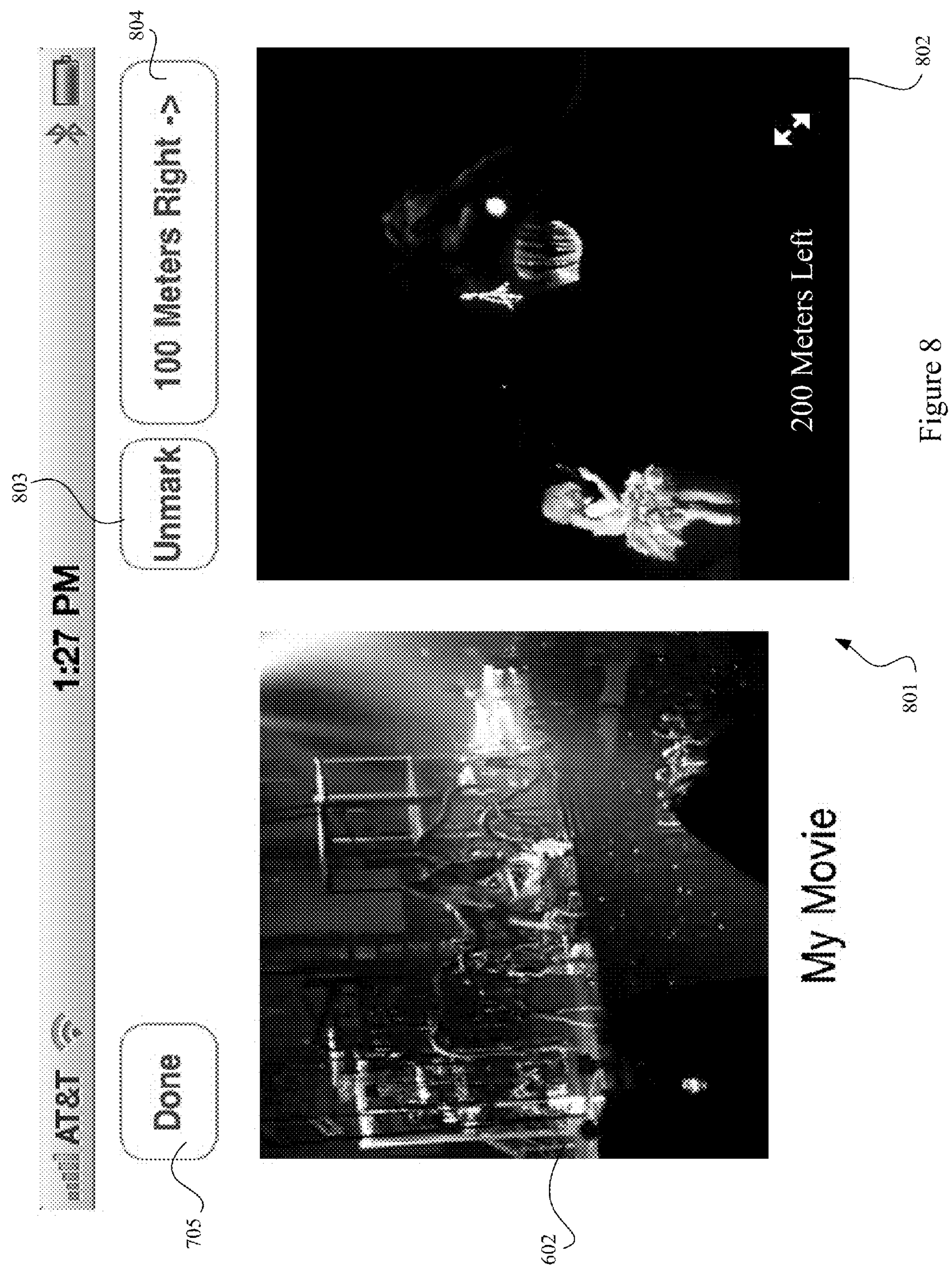

FIG. 8 is a GUI view which might be displayed by an app or a browser on the same mobile device if the user of the mobile device presses on the GUI control 704 labeled "←200 Meters Left". As shown in this figure, GUI view 801 also includes video player 602 that continues to display audio/video data currently captured by the mobile device, above a text box stating "My Movie". Above video player 602 is a control 705 (e.g., a GUI button) with a text label "Done" that allows the user of the mobile device displaying GUI view 801 to stop recording the audio/video data currently displayed in video player 602, e.g., if the user decides to use the audio/video data captured by one of the other two mobile devices capturing audio/video data at the event. Additionally, GUI view 801 includes another video player 802 that displays audio/video data currently captured by the other mobile device also capturing audio/video data at the event, namely, a mobile device that is "200 Meters Left" of the mobile device displaying GUI view 801, as indicated by the text label displayed at the bottom of video player 802. Above video player 802 is a control 803 (e.g., a GUI button) with a text label "Unmark" that allows the user of the mobile device displaying GUI view 801 to set the duration of the audio/video data being indexed (or stored) in the user's profile. (Not shown in FIG. 8 is control 803 in its initial state when its text label read "Mark".) Also above video player 802 is another control 804 (e.g., a GUI button) with a text label "100 Meters Right→*" which identifies the location of the mobile device capturing the audio/video data displayed in video player 702 in FIG. 7. It will be appreciated that if the user presses on control 804, the mobile device will display a GUI view that includes audio/video data currently captured by the mobile device that is located "100 Meters Right" of the mobile device displaying GUI view 801.

In an alternative example embodiment, one or more of the GUI controls shown in FIGS. 6, 7, and 8 might be replaced with other GUI widgets or controls, including GUI controls that (a) support swiping or other multi-touch gestures, or (b) motion sensing. For example, GUI control 604 (labeled "2 More") might be replaced by a GUI control that allows the user to search for other mobile devices (e.g., in a 360 degree circle whose center is the mobile device displaying the GUI view and whose radius might vary) of the mobile device displaying the GUI view by swiping the GUI control right or left, respectively.

Figure 9:
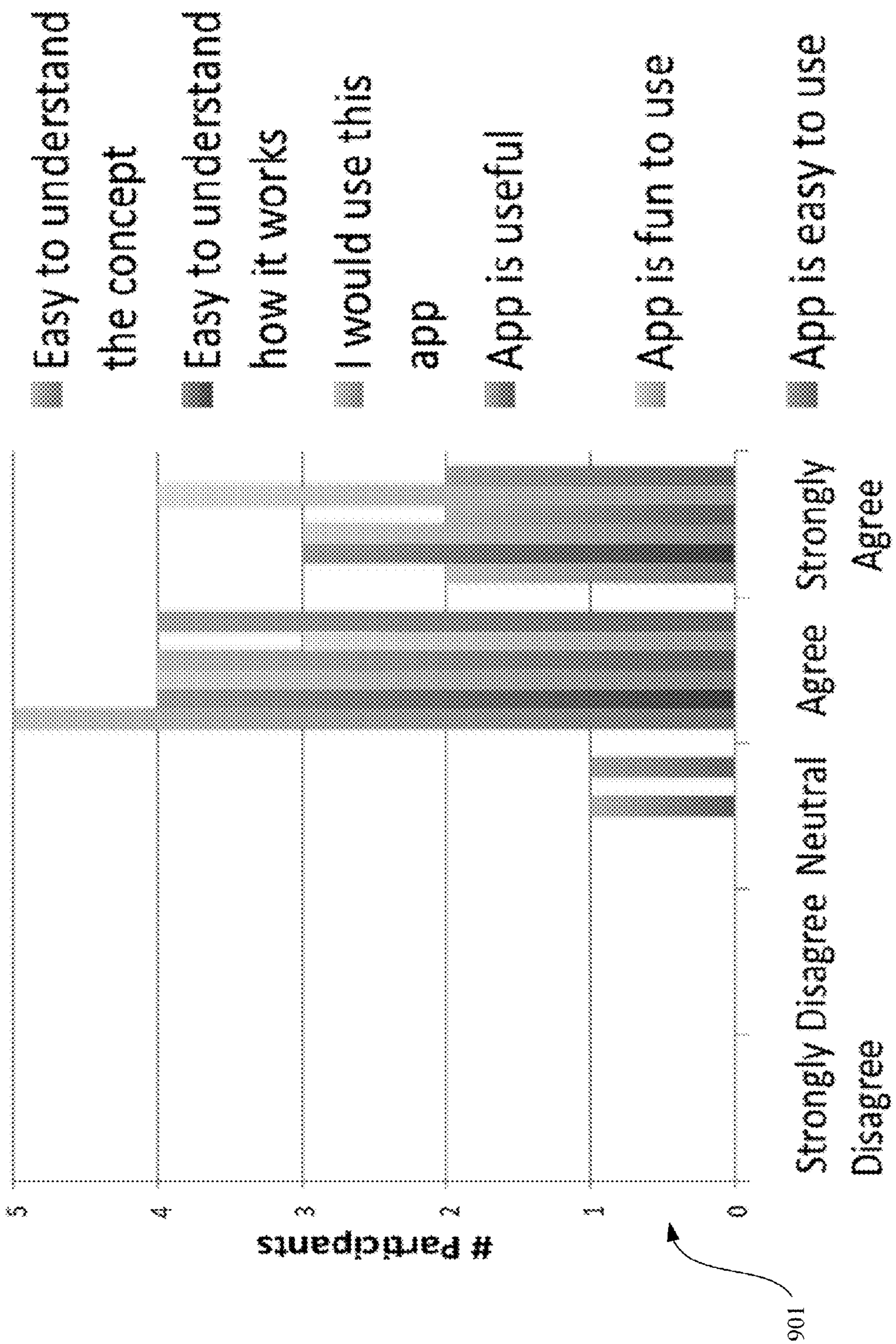
FIG. 9 is a graph showing the results of a usability survey relating to the GUI views displayed by an app on a mobile device in an ad hoc collaboration network for capturing audio/video data, in accordance with an example embodiment.

FIG. 9 is a graph showing the results of a usability survey relating to the GUI views displayed by an app on a mobile device in an ad hoc collaboration network for capturing audio/video data, in accordance with an example embodiment. As shown by graph 901, GUI views similar to those shown in FIGS. 6, 7, and 8 tended to be rated favorably by participants in an experiment using mocked-up versions of the GUI views. In this regard, all of the participants in the experiment agreed or strongly agreed with the following statements regarding the GUI views: (1) "Easy to understand the concept"; and (2) "Easy to understand how it works"; (3) "I would use this app"; and (4) "App is fun to use".

With the above embodiments in mind, it should be understood that the inventions might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the inventions are useful machine operations. The inventions also relate to a device or an apparatus for performing these operations. The apparatus may be specially constructed for the required purposes, such as the carrier network discussed above, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The inventions can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, DVDs, Flash, magnetic tapes, and other optical and non-optical data storage devices. The computer readable medium can also be distributed over a network coupled computer systems so that the computer readable code is stored and executed in a distributed fashion.

Although example embodiments of the inventions have been described in some detail for purposes of clarity of understanding, it will be apparent that certain changes and modifications can be practiced within the scope of the following claims. For example, some or all of the processes described above might be used with an audio player in the GUI views displayed by the mobile device, rather than a video player. Moreover, the operations described above can be ordered, modularized, and/or distributed in any suitable way. Accordingly, the present embodiments are to be considered as illustrative and not restrictive, and the inventions are not to be limited to the details given herein, but may be modified within the scope and equivalents of the following claims. In the following claims, elements and/or steps do not imply any particular order of operation, unless explicitly stated in the claims or implicitly required by the disclosure.

What is claimed is:

1. A method, comprising operations of:

authenticating a first user of a first mobile device and a second user of a second mobile device, wherein each of the mobile devices includes a video capturing device and wherein each user agrees or has previously agreed to share video data captured by the user with other authenticated users;

determining whether the first mobile device is located proximate to the second mobile device;

receiving video data captured by the second mobile device and transmitting the video data to the first mobile device for display along with an annotation indicating a location of the second mobile device relative to a location of the first mobile device, if the first mobile device is proximate to the second mobile device, wherein the second mobile device includes an accelerometer that is used to determine a measure of video quality that is displayed on the first mobile device along with the video data and the annotation; and receiving an indication from the first mobile device that at least some of the video data is to be indexed in a profile associated with the first user, wherein each operation is performed approximately in real time and is executed by one or more processors.

2. The method of claim 1, further comprising an operation of:

receiving a tag from the first user that identifies an event associated with the locations and storing the tag in the profile.

3. The method of claim 1, wherein the displaying of the video data and the annotation occurs in a view in a graphical user interface (GUI).

4. The method of claim 3, wherein the view includes controls that allow the users to communicate.

5. The method of claim 3, wherein the view is an interface displayed by a web browser.

6. The method of claim 1, wherein the determining operation includes ascertaining a location for the first mobile device and a location for the second mobile device using a hybrid positioning system.

7. The method claim 1, wherein the determining operation is based on location data retrieved through a web Application Programming Interface (API) exposed by a social networking website or a location-based social networking website.

8. The method claim 1, wherein the second mobile device includes a compass that is used to determine data as to camera angle that is displayed on the first mobile device along with the video data and the annotation.

9. An apparatus that includes a computer-readable storage medium persistently storing a program, wherein the program, when executed, instructs a processor to perform the following operations performed approximately in real time:

authenticate a first user of a first mobile device and a second user of a second mobile device, wherein each of the mobile devices includes a video capturing device and wherein each user agrees or has previously agreed to share video data captured by the user with other authenticated users;

determine whether the first mobile device is located proximate to the second mobile device;

receive video data captured by the second mobile device and transmitting the video data to the first mobile device for display along with an annotation indicating a location of the second mobile device relative to a location of the first mobile device, if the first mobile device is proximate to the second mobile device, wherein the second mobile device includes an accelerometer that is used to determine a measure of video quality that is displayed on the first mobile device along with the video data and the annotation; and receive an indication from the first mobile device that at least some of the video data is to be indexed in a profile associated with the first user.

10. An apparatus as in claim 9, wherein further comprising an operation of:

receiving a tag from the first user that identifies an event associated with the locations and storing the tag in the profile.

11. An apparatus as in claim 9, wherein the displaying of the video data and the annotation occurs in a view in a graphical user interface (GUI).

12. An apparatus as in claim 11, wherein the view includes controls that allow the users to communicate.

13. An apparatus as in claim 11, wherein the view is an interface displayed by a web browser.

14. An apparatus as in claim 9, wherein the determining operation includes ascertaining a location for the first mobile device and a location for the second mobile device using a hybrid positioning system.

15. An apparatus as in claim 9, wherein determining operation is based on location data retrieved through a web Application Programming Interface (API) exposed by a social networking website or a location-based social networking website.

16. An apparatus as in claim 9, wherein the second mobile device includes a compass that is used to determine data as to camera angle that is displayed on the first mobile device along with the video data and the annotation.

17. An apparatus as in claim 9, wherein at least some of the video data is persistently stored on the first mobile device.

18. A method, comprising operations of:

determining whether a first mobile device is located proximate to a second mobile device using wireless technology, wherein each of the mobile devices includes a video capturing device and wherein a user of each mobile device agrees or has previously agreed to share video data captured by the mobile device with other users who agree to share video data captured by their mobile devices;

receiving and displaying, at the first mobile device, video data captured by the second mobile device, along with an annotation indicating the location of the second mobile device relative to the first mobile device, if the first mobile device is proximate to the second mobile device, wherein the second mobile device includes an accelerometer that is used to determine a measure of video quality that is displayed on the first mobile device along with the video data and the annotation; and persistently storing at least some of the video data on the first mobile device upon receipt of a command from the user of the first mobile device, wherein each operation is performed approximately in real time and is executed by one or more processors.

19. The method of claim 18, wherein the displaying of the video data and the annotation occurs in a view in a graphical user interface (GUI).

20. The method of claim 18, wherein the determining operation includes ascertaining a location for the first mobile device and a location for the second mobile device using a hybrid positioning system.

* * * * *